United States Patent [19]

Denman

[11] 3,982,842
[45] Sept. 28, 1976

[54] COUPLING SOCKET WITH RELEASABLE TOOL RETAINER

[75] Inventor: Dennis Denman, Sutton, England

[73] Assignee: Matthias Spencer & Sons Limited, Sheffield, England

[22] Filed: Nov. 27, 1974

[21] Appl. No.: 527,859

[30] Foreign Application Priority Data
Nov. 27, 1973  United Kingdom............... 55058/73

[52] U.S. Cl.................................. 403/20; 403/316; 403/325; 403/360
[51] Int. Cl.².................... B25G 3/00; E21B 19/16; F16D 1/00
[58] Field of Search ............. 403/20, 105, 315, 316, 403/317, 326, 327, 324, 325, 360

[56] References Cited
UNITED STATES PATENTS

| | | |
|---|---|---|
| 302,519 | 7/1884 | Parsons........................... 403/324 X |
| 1,621,811 | 3/1927 | Richard et al. ................. 403/327 X |
| 2,954,994 | 10/1960 | Beers..................................... 403/20 |
| 3,176,998 | 4/1965 | Parker ............................. 403/20 X |
| 3,240,519 | 3/1966 | Weasler ............................. 403/325 |
| 3,608,936 | 9/1971 | Karden ........................... 403/327 X |

Primary Examiner—Werner H. Schroeder
Assistant Examiner—Wayne L. Shedd
Attorney, Agent, or Firm—Andrus, Sceales, Starke & Sawall

[57] ABSTRACT

A male member is connected to a female member by providing a rolling location element between a wall of the male member and a relatively inclined cooperative wall of the female member and biasing the location element into a position in which, should any attempt be made to remove the male member from the bore of the female member, a wedging action is obtained which prevents removal of the male member.

6 Claims, 11 Drawing Figures

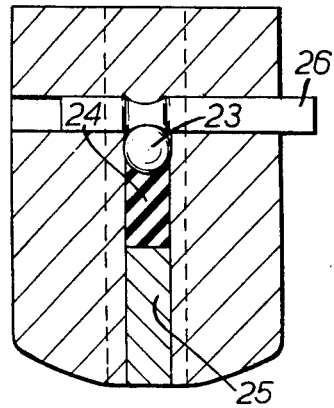
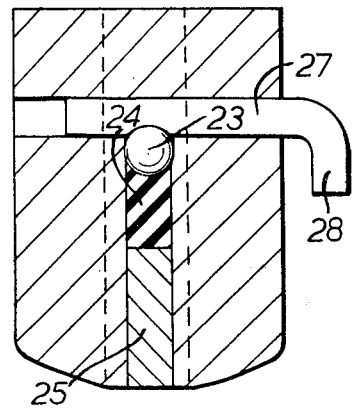
FIG. 6.   FIG. 7.
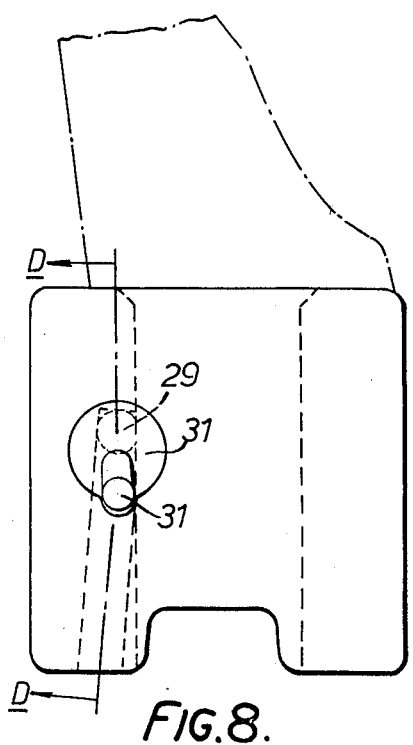
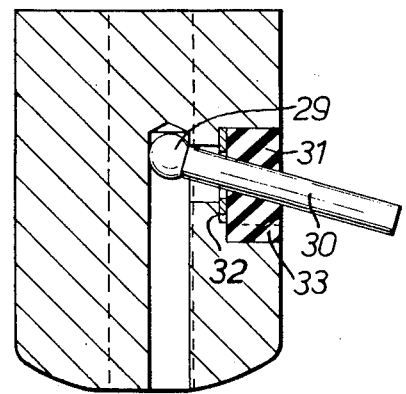
FIG. 8.   FIG. 9.

COUPLING SOCKET WITH RELEASABLE TOOL RETAINER

FIELD OF THE INVENTION

This invention relates to male and female coupling members.

BACKGROUND OF THE INVENTION

This invention has been developed in relation to the retention of a mineral mining pick in a pickbox and it is a specific object of the invention to provide means whereby positive retention of the pick in the box is obtained.

SUMMARY OF THE INVENTION

There is provided the combination of a male member and a female member having a bore within which the male member can be held, a wall of the bore of the female member being arranged so that, when the male member is fitted in said bore, at least a portion of said wall is inclined relative to a cooperative wall of the male member, a rolling location element being located between said walls and biased into a position in which, should any attempt be made to remove the male member from the bore of the female member, the wedging action obtained between the two walls and the rolling location element will be increased to prevent removal of the male member from the bore of the female member.

There is also provided a female member having a bore adapted to receive a male member, a wall of the bore of the female member including a rebate which receives a rolling location element which is biased into a position in which, when a male member is fitted into the bore of the female member, said rolling location element is subjected to a wedging action between a pair of relatively inclined surfaces of the male and female members, which wedging action is such that, if any attempt is made to remove the male member from the bore of the female member, the gripping force exerted on the male member to hold it in said bore will be increased.

Although the invention is primarily concerned with an arrangement wherein the rolling location element is carried by the female member, such element can in some instances be carried by the male member.

The rolling location element may be biased resiliently into its operative position and the resilient biasing means may comprise a block of rubber or like elastomeric material which engages the rolling location element and urges it into its operative position.

Coupling of the male member to the female member is preferably obtained by mere insertion of the male member into the bore of the female member, the rolling location element being displaced against the action of the resilient means with such displacement of the rolling location element serving to dispose the location element in a position in which a wedging action is obtained between the rolling location element and the pair of relatively inclined surfaces of the male and female members.

The operative surface of the female member may be afforded by the wall of a rebate formed in the side of the bore of the female member, which rebate is shaped to provide an operative surface which is inclined relative to the longitudinal axis of the bore such that the spacing between the axis and the operative surface progressively increases in the direction from the end of the bore at which the male member is inserted towards the opposite end thereof.

Manually operable means are preferably provided for effecting displacement of the rolling location element against the action of the resilient biasing means to effect uncoupling of the male and female members. Such manually operable release means can comprise a pin movable within a bore which extends transversely of the bore of the female member, which pin is formed with a neck portion to receive the rolling location element when said rolling location element is in its operative position, longitudinal displacement of the pin then moving a full diameter portion of the pin into engagement with the rolling location element to displace the rolling location element against the action of the resilient biasing means.

Said rolling location element may be a sphere, for example, a steel ball, though the rolling location element may take other forms, for example, it may comprise a pair of curvate end portions each of which has a part-spherical end surface interconnected by a junction portion of reduced width. The rolling location element may alternatively comprise a cylindrical element.

BRIEF DESCRIPTION OF THE DRAWINGS

FIG. 6 is a sectional view of the box along the line C—C of FIG. 5,

FIG. 7 illustrates a modification to the embodiment shown in FIG. 6,

FIG. 8 is a side view of a pick fitted in a fourth embodiment of pick-box,

FIG. 9 is a sectional view of the box along the line D—D of FIG. 8, and

DESCRIPTION OF THE PREFERRED EMBODIMENTS

Figure 1:
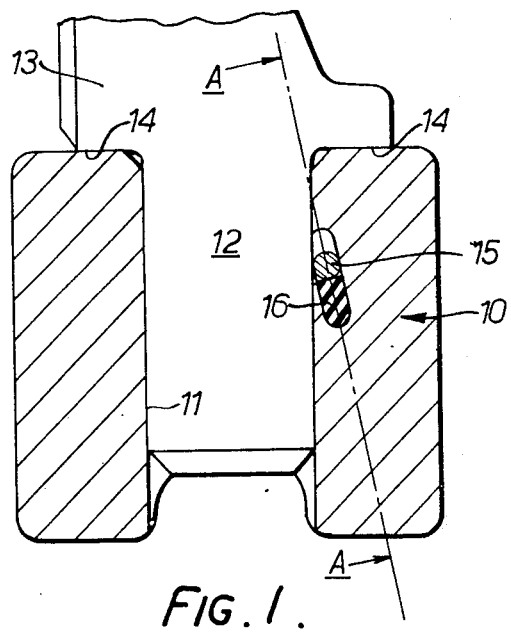
FIG. 1 is a sectional view of a coal cutting pick fitted in a pick-box.
Figure 2:
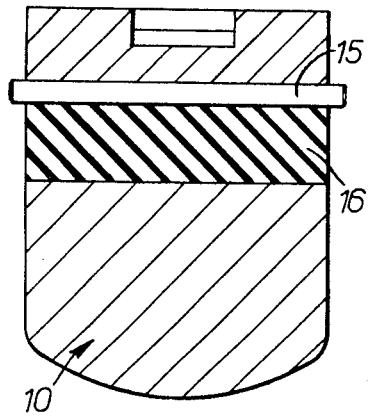
FIG. 2 is a sectional view of the box along the line A—A of FIG. 1.

The combination shown in FIGS. 1 and 2 comprises a pick-box 10 having a bore 11 in which the shank 12 of a coal-cutting pick 13 is received. The bore 11 and shank 12 are of rectangular form in plan and there will thus be no tendency for the pick 13 to rotate relative to the pick-box 10. The pick 13 includes a tool portion providing a pair of shoulders 14 which rest on and are supported by the upper surface of the box 10.

One of the walls of the box 10 is formed with a throughbore of lozenge shape in cross-section. The throughbore contains a cylindrical pin 15 the ends of which project beyond the ends of the throughbore and the pin 15 is urged upwardly by means of a resilient rubber pad 16 fitted in the throughbore so as to fill the bore substantially completely. The walls of the throughbore are inclined to the vertical as can be seen from FIG. 1 and, although the pin 15 will be in its uppermost position as shown in FIG. 2 when the pick 13 is removed, the pin 15 will be displaced into the position shown in FIG. 1 when the shank 12 of the pick 13 is inserted.

As can be seen from FIG. 1, the pin 15 is urged into a position in which it is effectively wedged between a pair of relatively inclined surfaces and the arrangement is such that, should any attempt be made to remove the pick shank 12 from the bore 11, the frictional forces acting between the surface of the shank 12 and the surface of the pin 15 will tend to urge the pin 15 to roll upwardly, i.e. any upward displacement of the pick 13 will result in inward displacement of the pin 15 thereby increasing the gripping force exerted on the pick shank 12 to retain it in the bore 11. When, however, it is desired to remove the pick, all that is necessary is for the pin 15 to be pressed downwardly against the biasing force of the rubber pad 16 out of engagement with the surface of the shank 12 and the gripping action is released. Downward movement of the pin 15 is effected by grasping the ends thereof which project from the sides of the box.

Figure 3:
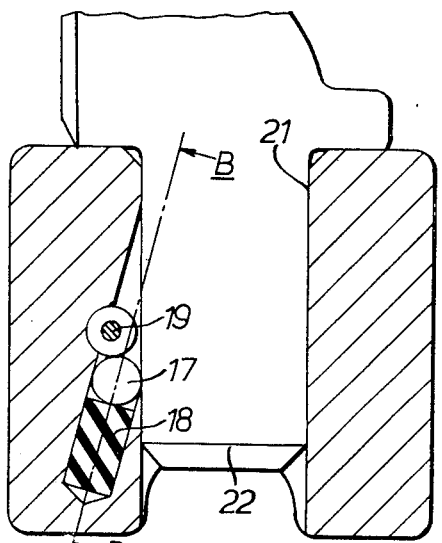
FIG. 3 is a sectional view of a pick fitted in a second embodiment of pick-box.
Figure 4:
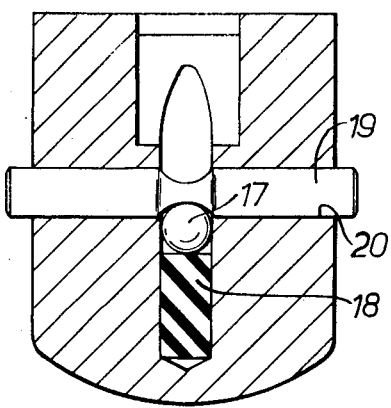
FIG. 4 is a sectional view of the box along the line B—B of FIG. 3.

In the arrangement shown in FIGS. 3 and 4, the location element is a ball 17 which is shown in a withdrawn position in FIG. 3 and in its operative position in FIG. 4. The ball 17 is urged by a resilient block 18 into engagement with a necked pin 19 which is contained in a bore 20 in the pick-box and is longitudinally displaceable therein. When the pin 19 is in the position shown in FIG. 4, the ball 17 is aligned with the neck in the pin 19 and the ball is therefore free to project into the bore 21 of the box in which the pick shank 22 is inserted. The ball 17 is disposed between a pair of relatively inclined surfaces and, as described above in relation to the embodiments of FIGS. 1 and 2, a wedging action is obtained preventing undesired removal of the pick shank. When, however, removal of the pick is required, one end of the pin 19 is pressed to move a full diameter portion of the pin 19 into engagement with the ball 17 and thus displace the ball 17 downwardly out of engagement with the surface of the shank.

Figure 5:
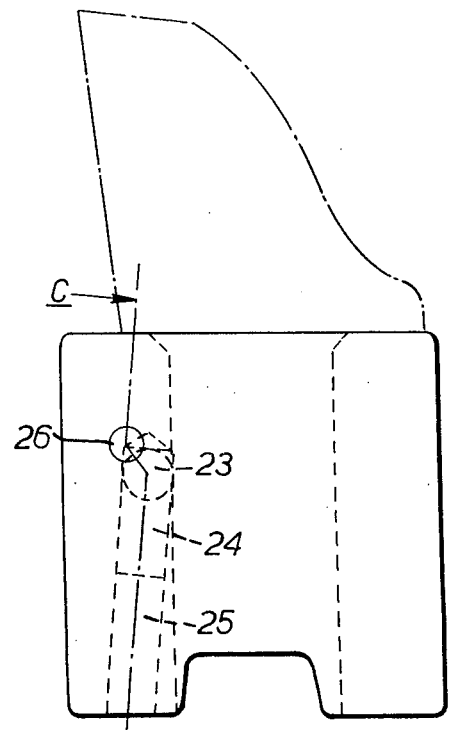
FIG. 5 is a side view of a pick fitted in a third embodiment of pick-box.

The bore in which the block 18 and ball 17 are received is formed by drilling from within the interior of the bore 21 in which the shank 22 is fitted. However, an alternative arrangement is shown in FIGS. 5 and 6 and in this case a bore is drilled from the lower surface of the pick-box. After the bore has been drilled and a ball 23 and a rubber pad 24 have been appropriately positioned, the lower end of the drilled bore is closed by a plug 25. The ball 23 is urged, as described above with reference to FIGS. 3 and 4, into engagement with a necked pin 26 which is displaceable longitudinally to move the ball 23 between its operative and its inoperative position. The mode of action and the method of release of the embodiment shown in FIGS. 5 and 6 are as described above with reference to FIGS. 3 and 4. The inclination of the bore 21 to the axis of the drilled bore containing the ball 23 is less than 10° and, as shown in FIG. 5, the inclination is approximately 6°.

In the modification shown in FIG. 7, the necked pin 26 is replaced by a rotatable pin 27 which is of L-shape to provide a turning handle 28. The stem of the pin 26 is formed with a depression and the arrangement is such that, when the ball 23 is free to enter the depression, the ball 23 exerts a gripping action on the pick shank whereas, when the pin 27 is rotated and the ball 23 is accordingly displaced downwardly, the gripping action is released and the pick shank can be removed.

FIGS. 3 to 7 illustrate embodiments which involve the use of separate pins and balls. However, the embodiment of FIGS. 8 and 9 includes a location element which comprises a substantially spherical formation 29 at the end of and integral with a stem 30. The stem 30 passes through an opening formed in a resilient rubber plug 31 fitted in a socket in a wall of the pick-box. The rubber of the plug 31 is under strain in the position of the stem 30 shown in FIG. 9 whereby the free end of the stem 30 is continuously biased in a downward direction and the spherical formation 29 is continuously biased in an upward direction. Thus, as described in relation to the previous embodiments, a wedging action is obtained upon rolling of the formation 29 when there is any tendency for undesired upward movement of the pick shank out of the box. Of course, when pick removal is required, the free end of the stem 30 is moved upwardly so as to effect pivotal movement of the stem and move the formation 29 clear of the adjacent surface of the shank. A rigid backing element 32 is fitted in the base of the socket which receives the plug 31, the backing element 32 being formed with a lozenge-shaped slot the boundary wall of which acts to limit the range of movements of the stem 30. As with the embodiment shown in FIGS. 5 and 6, the inclination of the bore containing the spherical formation 29 to the bore 21 containing the shank is less than 10°. Again, the angle shown in FIG. 8 is approximately 6°.

Figure 10:
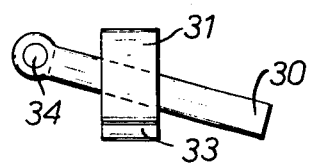
FIGS. 10 and 11 illustrate modifications of the embodiment shown in FIGS. 8 and 9.
Figure 11:
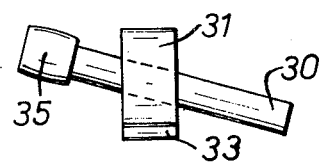

The plug 31 is of cylindrical form with an external longitudinal rib 33 which fits in a groove in the wall of the socket to prevent rotation of the plug. This rib 33 can also be seen in FIGS. 10 and 11 which illustrate alternative forms of location element to that shown in FIGS. 8 and 9. The end formation of the pin shown in FIG. 10 is generally spherical but with a flat 34 whereas the end formation 35 of FIG. 11 is of generally barrel shape though it may equally well be of cylindrical form. What is important is that the end formation should have a curvate surface which engages the adjacent surface of the shank whereby, when there is any undesired upward movement of the shank, the end formation will tend to roll in an upward, and hence inward, direction to increase the gripping force exerted on the pick shank.

What is claimed is:

1. The combination of a male member and a female member wherein the female member has a bore within which the male member can be held and in which a wall of the bore of the female member is so formed that, when the male member is fitted in the bore, at least a portion of the wall of the bore of the female member is inclined at an acute angle relative to a cooperative surface of the male member, a rolling location element being located between said wall of the female member and said surface of the male member with resilient biasing means engaging the rolling location element and wedging it into an operative position in which, if any attempt is made to remove the male member from the bore of the female member, the wedging action obtained between the wall of the female member, the surface of the male member and the rolling location element will be increased to prevent removal of the male member from the bore of the female member, manually operable release means being provided for effecting displacement of the rolling location element against the action of the resilient biasing means to permit uncoupling of the male and female members, said rolling location element comprising a sphere and the manually operable release means comprising a pin movable within a passage which extends transversely of the bore of the female member, which pin is formed with a recessed portion to receive the rolling location element when said location element is in its operative position and the pin being movable to displace the recess thereof relative to the rolling location element and hence move the location element out of its operative position.

2. The combination according to claim 1, wherein the recessed portion of the pin is a necked portion thereof.

3. The combination of a male member and a female member wherein the female member has a bore within which the male member can be held and in which a wall of the bore of the female member is so formed that, when the male member is fitted in the bore, at least a portion of the wall of the bore of the female member is inclined at an acute angle relative to a cooperative surface of the male member, a rolling location element being located between said wall of the female member and said surface of the male member with resilient biasing means engaging the rolling location element and wedging it into an operative position in which, if any attempt is made to remove the male member from the bore of the female member, the wedging action obtained between the wall of the female member, the surface of the male member and the rolling location element will be increased to prevent removal of the male member from the bore of the female member, manually operable release means being provided for effecting displacement of the rolling location against the action of the resilient biasing means to permit uncoupling of the male and female members, and the rolling location element comprising an end portion of a pin, which pin constitutes the manually operable release means.

4. The combination according to claim 3, wherein the resilient means acting on the rolling location element is in the form of a block surrounding the stem of the pin.

5. The combination of a male member and a female member wherein the female member has a bore within which the male member can be held and in which a wall of the bore of the female member is so formed that, when the male member is fitted in the bore, at least a portion of the wall of the bore of the female member is inclined at an acute angle relative to a cooperative surface of the male member, the rolling location element being located between said wall of the female member and said surface of the male member with resilient biasing means engaging the rolling location element and wedging it into an operative position in which, if any attempt is made to remove the male member from the bore of the female member, the wedging action obtained between the wall of the female member, the surface of the male member and the rolling location element will be increased to prevent removal of the male member from the bore of the female member, manually operable release means being provided for effecting displacement of the rolling location element against the action of the resilient biasing means to permit uncoupling of the male and female members, which rolling location element comprises a pin which is contained within a slot in the female member, the slot extending from side-to-side of the female member with an end portion of the pin projecting from the sides of the slot to constitute the manually operable release means and the resilient means being in the form of a block which is disposed between the pin and the base of the slot.

6. The combination of a male member and a female member wherein the female member has a bore within which the male member can be held and in which a wall of the bore of the female member is so formed that, when the male member is fitted in the bore, at least a portion of the wall of the bore of the female member is inclined at an acute angle relative to a cooperative surface of the male member, the rolling location element being located between said wall of the female member and said surface of the male member with resilient biasing means engaging the rolling location element and wedging in into an operative position in which, if any attempt is made to remove the male member from the bore of the female member, the wedging action obtained between the wall of the female member, the surface of the male member and the rolling location element will be increased to prevent removal of the male member from the bore on the female member, manually operable release means being provided for effecting displacement of the rolling location element against the action of the resilient biasing means to permit uncoupling of the male and female members, and wherein the male members comprises a plain-sided shank and the inclination between the surface of the shank engaged by the rolling location element and the cooperative wall of the female member is less than 10°.

* * * * *